(12) United States Patent
Williams

(10) Patent No.: US 6,832,621 B1
(45) Date of Patent: Dec. 21, 2004

(54) TRANSMITTER ISOLATION BALL VALVE

(75) Inventor: Archie Mack Williams, Birmingham, AL (US)

(73) Assignee: Trans-Valve, Inc., Birmingham, AL (US)

( * ) Notice: Subject to any disclaimer, the term of this patent is extended or adjusted under 35 U.S.C. 154(b) by 0 days.

(21) Appl. No.: 10/326,735

(22) Filed: Dec. 20, 2002

Related U.S. Application Data (60) Provisional application No. 60/362,696, filed on Mar. 8, 2002.

(51) Int. Cl.[7] .......................... B08B 9/032; F16K 5/06; F16K 51/00; G01L 27/00
(52) U.S. Cl. .................... 137/239; 73/1.72; 134/166 C; 137/240; 137/312; 137/625.22; 137/625.47; 251/315.12; 251/315.13
(58) Field of Search ...................... 73/1.72; 137/625.21, 137/625.22, 238, 239, 240, 312, 625.46, 625.47; 251/315.12, 315.13; 134/166 C (56) References Cited

U.S. PATENT DOCUMENTS

| | | | |
|---|---|---|---|
| 3,508,738 A | | 4/1970 | Atkinson et al. |
| 3,525,352 A | * | 8/1970 | Jensen .......................... 137/238 |
| 3,596,680 A | * | 8/1971 | Adams ......................... 137/240 |
| 3,605,789 A | * | 9/1971 | Graham ....................... 137/240 |
| 3,722,859 A | | 3/1973 | Murphy et al. |
| 4,099,543 A | * | 7/1978 | Mong et al. ............ 137/625.22 |
| 4,552,334 A | * | 11/1985 | Tomiyama et al. .... 137/625.47 |
| 4,606,368 A | | 8/1986 | McCafferty |
| 4,756,479 A | * | 7/1988 | Lazenby, III .......... 137/625.22 |
| 4,792,118 A | | 12/1988 | Yusko, Jr. et al. |
| 4,846,212 A | * | 7/1989 | Scobie et al. ................ 137/240 |
| 4,940,208 A | | 7/1990 | Kemp |
| 5,267,722 A | | 12/1993 | Coulter |
| 5,467,796 A | | 11/1995 | Pettinaroli et al. |
| 5,755,427 A | | 5/1998 | Koskinas |
| 5,842,683 A | * | 12/1998 | Wei ............................. 137/240 |
| 5,934,645 A | | 8/1999 | Calvin |
| 6,079,443 A | * | 6/2000 | Hutton ........................ 137/597 |
| 6,321,773 B1 | * | 11/2001 | Ramsby ...................... 137/240 |

* cited by examiner

Primary Examiner—George L. Walton
(74) Attorney, Agent, or Firm—Kenneth M. Bush; Bush IP Law Group, LLC (57) ABSTRACT

A ball valve assembly of the quarter-turn type for use in isolating an electronic level transmitter comprising a valve body having an inner chamber, an inlet or tank-side port, an outlet or transmitter side port, a valve body axis defined by the inlet and outlet ports, and a substantially spherical ball valve member having an inner surface forming a through passage mounted in the chamber for selective rotation between an open position and a closed position. The present invention allows for flushing the diaphragm face of a level transmitter with the ball valve member in an open position via a purge port positioned on the valve body and a purge passage connecting the through passage and a seating face portion of the outer surface of the ball valve member. The present invention is provided with a full port opening through the ball valve assembly for enhancing the accuracy of level transmitter readings and valve backflush capabilities. The present invention has a handle with a distal end having a longitudinal axis positioned offset from the valve body axis at an angle of about forty-five degrees when the ball valve member is in its respective open and closed positions so that the valve assembly may be positioned and operated within a small recess area formed in tank wall insulation.

24 Claims, 5 Drawing Sheets

TRANSMITTER ISOLATION BALL VALVE

This application claims priority from U.S. Provisional Application No. 60/362,696, filed on Mar. 8, 2002.

FIELD OF THE INVENTION

The present invention relates to flow control valves of the quarter-turn ball valve type, and more particularly, to ball valve assemblies used in isolating electronic level transmitters operatively connected to fluid storage tanks.

BACKGROUND OF THE INVENTION

Electronic liquid level transmitters are utilized extensively with fluid storage tanks in the chemical and pulp and paper industries to monitor the volume of fluid contained in a tank. Liquid level transmitters have diaphragm faces that are placed in fluid communication with the bottom of a fluid storage tank, which measure the head pressure caused by changes in the liquid level and transmit an electronic output signal proportional to the measured head pressure. The output signal produced by an electronic level transmitter is then used to monitor the liquid level and volume in the storage tank or the density of the material stored in the tank where the volume of material in the tank has been determined by another means. In many manufacturing environments, level transmitters provide a continuous level indication that is one of several variables monitored in a complex process control system. For such systems, maintaining the level transmitter in proper working order is critical to maintaining safe and normal process operations. Reliable and accurate electronic level transmitters are relied upon to avoid hazardous and costly operational upsets, such as tank overflows.

Electronic level transmitters are typically of the flange-mounted type, which connect to outlet piping located at or near the bottom of a fluid storage tank. In many cases, liquid storage tanks are provided at the bottom with a three inch pipe and flanged outlet for attaching the level transmitter. Such flange-mounted transmitters are therefore typically sized for use with three inch outlet piping, and a three inch, class 150 ANSI pipe size flange connector. The level transmitter may be provided with a diaphragm face for sensing the liquid head pressure that is flush mounted to the flange, that is, a planar diaphragm face mounted flush with gasket surface of a three inch, class 150 ANSI flange.

A transmitter isolation valve is required between the tank outlet piping and the level transmitter to allow the transmitter to be removed without having to drain the tank or otherwise disrupt process operations, such as for repairs, cleaning, re-calibrating or replacement of the transmitter. One of the largest users of level transmitters is the pulp and paper industry, and it is well known in the prior art to utilize three-inch sized knife gate valves for transmitter isolation. For this application, level transmitters of the knife gate type have the benefit of being narrow-body, which allows the isolation valve to be mounted as close to the liquid storage tank as possible. This saves valuable space in crowded manufacturing environments and provides for greater access to the transmitter for maintenance workers and equipment. Additionally, storage tanks in the pulp and paper industry are often used to store aqueous liquids that contain varying degrees of sedimentation and pulp fibers that settle at the bottom of storage tanks. Level transmitters mounted closely to a storage tank eliminate excess piping space for the buildup of sediment and pulp fibers.

But there are many limitations associated with the use of transmitter isolation valves of the knife gate type. For instance, because these valves are mounted close to the storage tanks to which they are operatively connected, there is not enough room to utilize a typical round handwheel to open and close the valve. To open and close such valves, operators are required to rely on a ratchet-type device with a piece of pipe, or ratchet wrench, as a handle. This requires an excessive number of strokes of the handle to open and close the valve. On account of the corrosive nature of the fluids utilized with these valves, another limitation is the valves often corrode and fail to function effectively. An additional limitation of knife gate valves is difficulty associated with preventing leakage through the gate seat area because the valve stays open for long periods of time.

Additional difficulties associated with the use of knife gate transmitter isolation valves pertain to the manner in which the gate, or blade, of the valve must be sealed as it extends and retracts through the packing gland during use. Because of the wide, flat, and thin dimensions of typical blades, as well as the blades having four sharp and square corners, the pressing of the packing material against the blade to prevent leakage from the valve into the atmosphere can be problematic. For instance, tightening the packing gland of such valves can render the valve inoperable due to excessive levels of force being required to move the blade up or down. Loosening the packing gland to allow the valve to readily open and close may result in the problem of external leakage. As the result of increasingly stringent leak prevention performance standards for industrial valves issued by such agencies as the Environmental Protection Agency (EPA) and Occupational Health and Safety Administration (OSHA), these problems have become more significant and costly.

On account of the limitations of knife gate valves for use in isolating level transmitters, valves of the ball valve type have begun being used in this service. These valves are quarter-turn valves wherein an internally mounted ball member rotates between a ninety degree arc to open or close the valve. These valves are typically teflon-seated to allow for leak-tight shutoff and are manufactured of stainless steel, hastelloy, or titanium for corrosion resistance. There has been a reluctance to accept valves of the ball valve type as a suitable replacement for knife gate valves. One reason is in order to be a direct replacement for narrow knife gate valves, conventional ball valves for use in isolating transmitters have had narrow flow-through ports in conjunction with a recess machined into the transmitter side of the valve body to provide a three inch sensing area for the diaphragm of the level transmitter. Narrow flow-through ports increase the likelihood that the isolation valve will be plugged by sedimentation and pulp fibers, creating operating problems. Further, there is a need to provide conventional transmitter isolation valves of the ball valve type with improved back-flushing means, which would reduce the need for costly removal of the level transmitter for maintenance or replacement of the level transmitter.

From the foregoing it may be seen that heretofore, no one has adequately provided a ball valve for use in isolating level transmitters. A need exists for a corrosion resistant, quarter-turn ball valve for use in isolating a level transmitter that provides bubble-tight shutoff, that may be easily installed as a replacement for knife gate or other flanged valves and that addresses the limitations of the prior art transmitter isolation valves of the knife gate and ball valve type.

SUMMARY OF THE PRESENT INVENTION

It is an object of the present invention to provide an improved ball valve which is superior to those presently used to isolate electronic level transmitters.

A further object of the present invention is to provide a transmitter isolation ball valve that provides means for flushing the diaphragm face of an electronic level transmitter operatively connected thereto.

Another object of the present invention is to provide a transmitter isolation ball valve having a full port for enhancing the accuracy of level transmitter readings and the backflush capabilities of the valve.

A still further object of the present invention is to provide a transmitter isolation ball valve that may be readily used for replacing transmitter isolation valves of the knife gate type.

Another object of the present invention is to provide a transmitter isolation valve having means for flushing the diaphragm face of a level transmitter when the valve is in an open position and means for calibrating the level transmitter when the valve is in a closed position.

A further object of the present invention is to provide a transmitter isolation valve having a single flush port for backflushing the diaphragm face of a level transmitter when the valve is in an open position and also for depressuring the valve body when the valve is in a closed position.

These and other objects of the present invention are accomplished through the use of a ball valve assembly of the quarter-turn type for use in isolating a level transmitter comprising a valve body having an inlet or tank-side port, an outlet or transmitter side port, an inner chamber, and a substantially spherical ball valve member mounted in the chamber for selective rotation between an open position and a closed position. When the ball valve member is in an open position, fluid communication is established between the inner chamber and the inlet port and outlet port to allow fluid flow therethrough.

The ball valve member of the present invention has an inner surface forming a substantially cylindrical through passage that is in axial alignment with the inlet port and outlet port to allow fluid flow therethrough when the ball valve member is in an open position. The present invention, unlike conventional transmitter isolation valves, preferably provides a full port that is a cylindrical opening through the ball valve assembly having a uniform diameter substantially identical to the nominal pipe size connected thereto. Overcoming the limitations of the prior art, a full port configuration minimizes interference on the operation of a level transmitter resulting from the presence of a restricted opening across the transmitter isolation valve and associated increased pressure drop across the valve. This allows the level transmitter to operate more accurately and with less maintenance. The present invention preferably has a cylindrical opening through the valve body having a minimum diameter equal to the nominal size of standard three-inch inner diameter tank side piping.

The present invention further preferably comprises means for flushing a flush-mounted diaphragm face of a level transmitter connected to the outlet port. The present invention comprises a purge port positioned on the valve body that is in alignment with a cylindrical purge passage formed in the ball valve member when the ball valve member is in an open position. The purge passage has a first end formed in the inner surface of the ball valve member and a second end formed in an outlet port sealing face of the ball valve member. The purge passage is located concentrically about a purge passage axis that passes through the outlet port when the ball valve member is in an open position. In this manner the purge port and purge passage provide means for directing a purge fluid onto the diaphragm face of a level transmitter operatively connected to the outlet port of the ball valve assembly. This provides means for flushing the diaphragm face of the level transmitter and means for backflushing the valve which is enhanced by the full port configuration of the valve. Thus, the present invention provides means for reverse flushing or backflushing the ball valve assembly without removing it from the piping on which it is installed or draining the storage tank and associated piping.

The purge passage further preferably provides means for depressuring the inner chamber of the valve body with the ball valve member moved to the closed position. This enhances safety associated with level transmitter maintenance, by relieving excess pressure buildup between the sealed inlet port and the level transmitter prior to removing the level transmitter from the outlet port. Depressuring the inner chamber of the ball valve body with the ball valve member in a closed position also provides confirmation that the inlet port is properly sealed prior to removing the level transmitter. In addition to bleeding off entrapped pressure, media collected in the valve body can also be removed prior to removing the level transmitter. Additionally, the purge passage and purge port also provide for calibration of the level transmitter without disrupting process operations, because fluid communication is established between the purge port and transmitter when the ball valve member is in the closed position. With the valve in a closed position, a pressure testing device can be attached to the purge port to calibrate the level transmitter. It can be appreciated that the single purge/calibration port of the present invention may be utilized to not only flush the diaphragm face of the level transmitter and backflush the ball valve assembly with the valve in an open position, but also to depressurize the ball valve assembly and calibrate the level transmitter with the valve in a closed position.

The present invention may also be utilized to readily replace transmitter isolation valves of the knife gate type. The valve assembly includes a pair of opposing flanges, a transmitter side flange and a tank side flange. The transmitter side flange is provided with four bolt holes positioned along the outer periphery of the flange in a standard ANSI 150 stud bolt orientation. The tank side flange of the present invention provides four bolt holes in this standard configuration, and additionally two upper bolt slots that accommodate non-standard pipe flanges, namely, pipe flanges configured to mount an isolation valve of the knife gate type. This allows the present invention to replace a transmitter isolation valve of the knife gate type without having to replace or retrofit the pipe flange used in mounting the knife gate valve.

The present invention also overcomes limitations relating to the mounting of certain prior art transmitter isolation ball valves where a knife gate transmitter isolation valve had been used. Many of such valves required special cut-to-length all-threaded studs to mount the valve. Some models required that existing threaded bolt holes be drilled out to allow them to be slipped over the special threaded studs. Other models intended to eliminate this need causes the transmitter isolation valve and level transmitter to be positioned approximately twelve and one-half degrees from vertical when mounted. The present invention eliminates all of these undesirable mounting limitations. To mount the present invention in the desired vertical position where a knife gate transmitter isolation valve had been used requires only eight standard off-the-shelf hex head cap screws.

The present invention further preferably comprises means for selectively rotating the ball valve member comprising a handle with an upper flat portion with a longitudinal axis that is offset from the centerline of the valve body. The offset angle is preferably forty-five degrees, which allows the present invention to be utilized in a cavity formed in tank wall insulation where the ball valve assembly is installed in a recessed area within the tank wall installation. With the handle configuration of the present invention, the distal end of the handle will clear insulation as it is moved between an open and closed position, thereby minimizing the size of the cavity necessary to operate the ball valve assembly.

These and other objects and advantages of the invention will become apparent from the following detailed description of the preferred embodiment of the invention.

BRIEF DESCRIPTION OF THE DRAWINGS

A transmitter isolation ball valve embodying the features of the present invention is depicted in the accompanying drawings which form a portion of this disclosure and wherein.

DESCRIPTION OF THE PREFERRED EMBODIMENT

Figure 1:
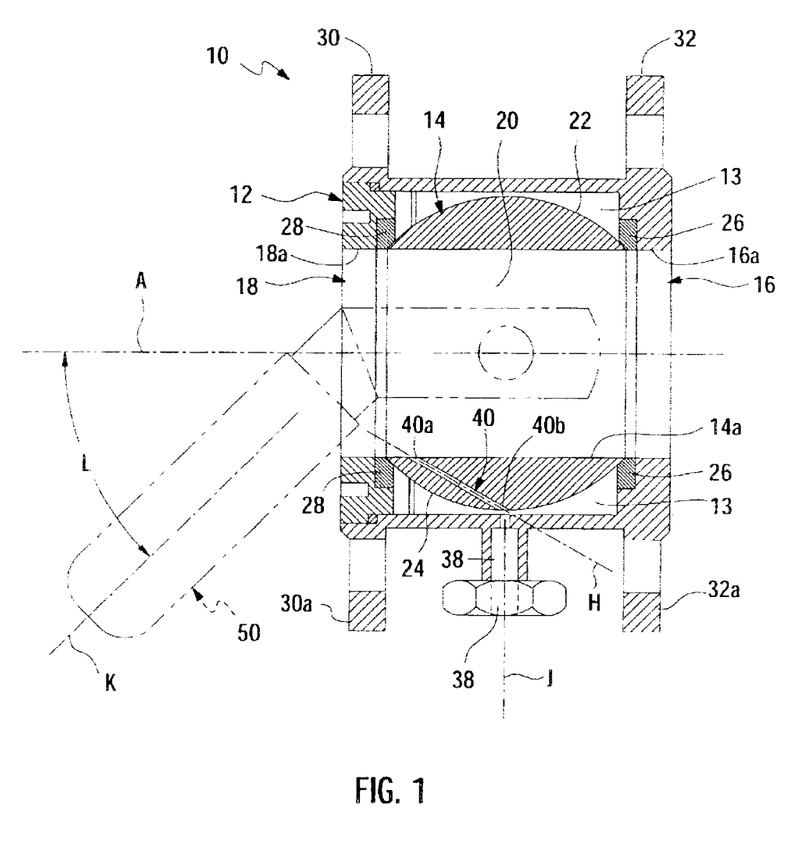
FIG. 1 is a top sectional view of the preferred embodiment of a ball valve assembly of the present invention in an open position.
Figure 2:
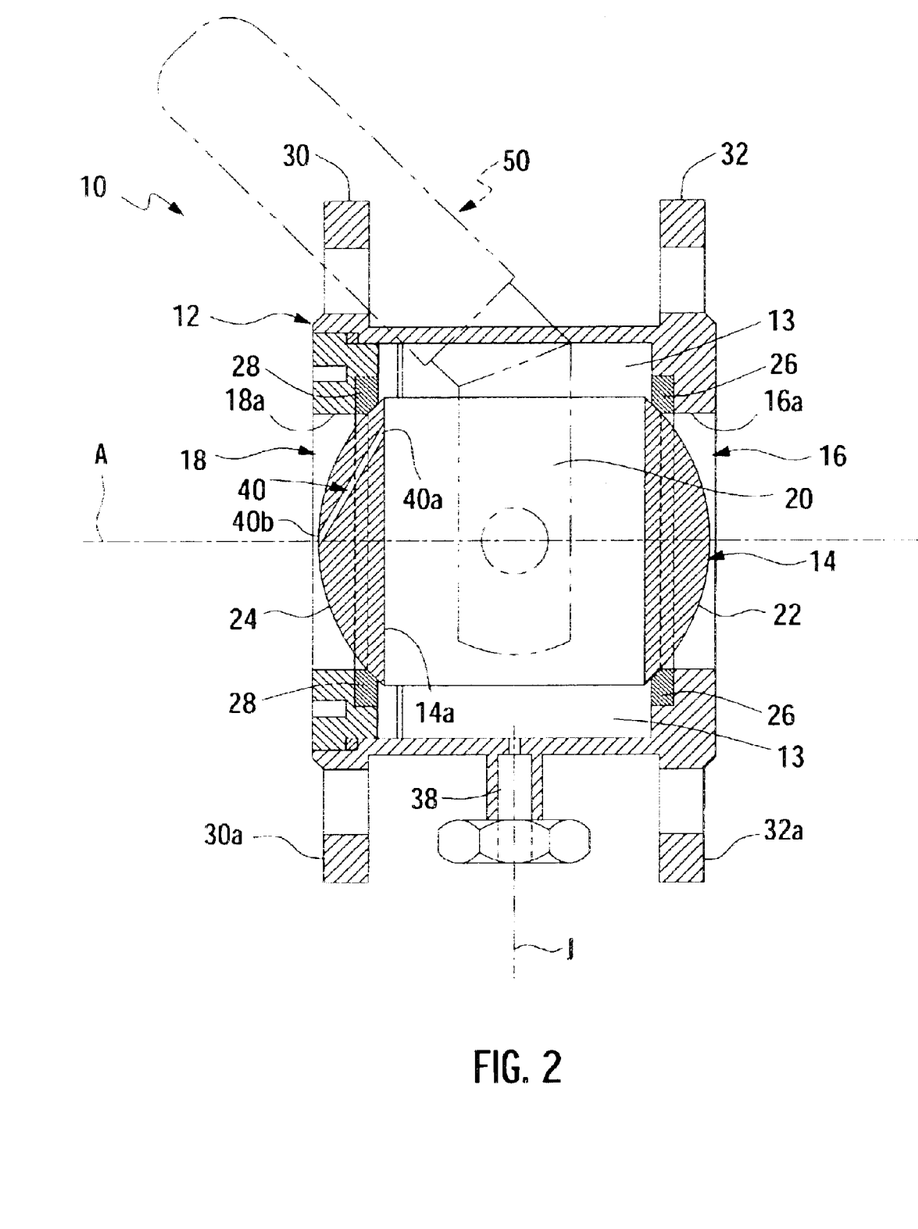
FIG. 2 is a top sectional view of the preferred embodiment of a ball valve assembly of the present invention in a closed position.

Referring to the FIGS. 1–6 for a clearer understanding of the invention, it may be seen that the invention contemplates a ball valve assembly 10 for use in isolating a level transmitter (not shown). The preferred embodiment of the ball valve assembly 10 of the present invention comprises a ball valve body 12 having an inner chamber 13, and a substantially spherical ball valve member 14 mounted in the chamber. The ball valve assembly 10 of the present invention is of the quarter-turn type, and the ball valve member 14 may be selectively rotated ninety degrees between an open position as shown in FIG. 1 and a closed position as shown in FIG. 2. The ball valve body 12 and ball valve member 14 and components thereof are comprised of suitable corrosion-resistant materials, such as, but not limited to, stainless steel, hastelloy, teflon, or titanium.

Figure 3:
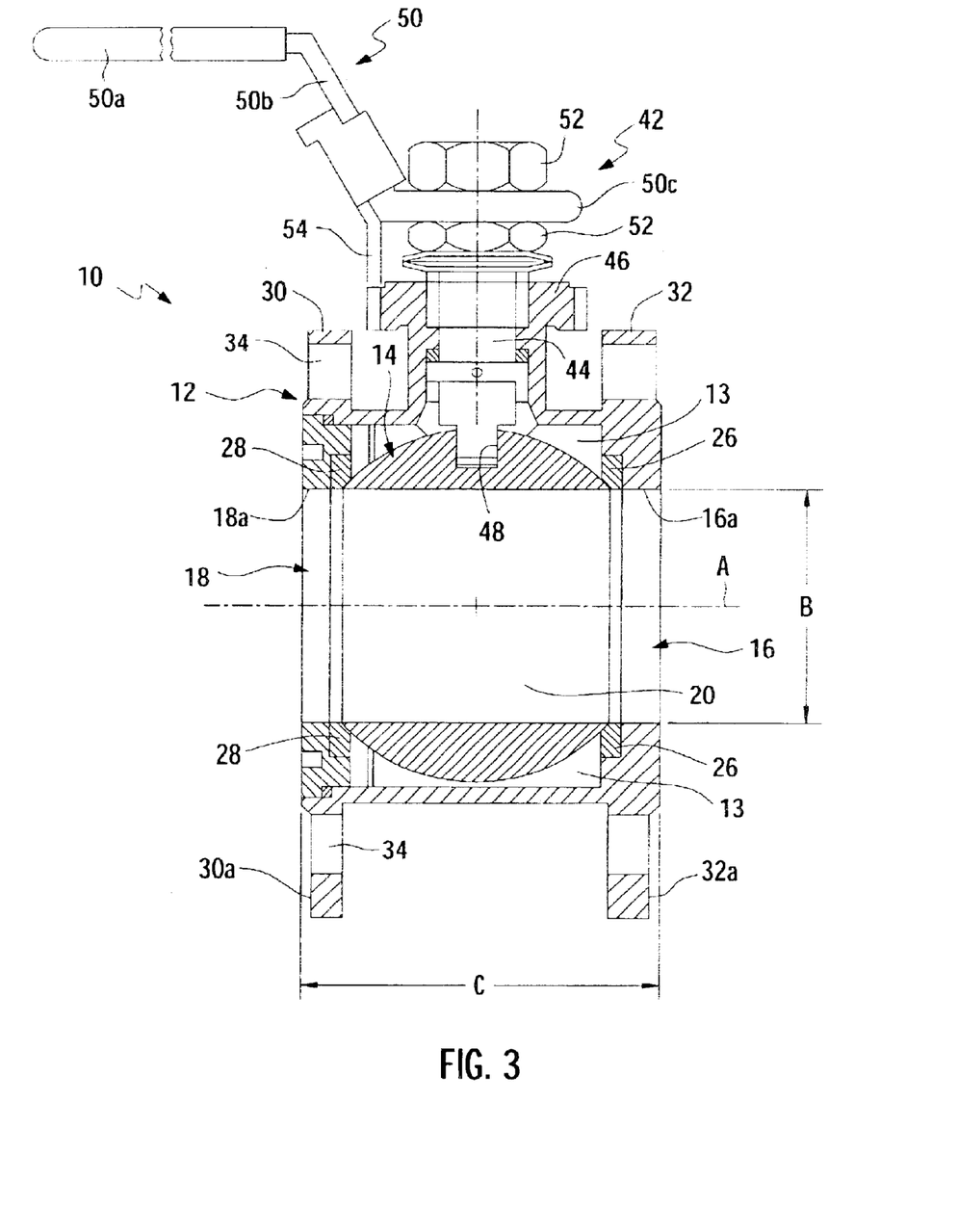
FIG. 3 is a front sectional view of the preferred embodiment of a ball valve assembly of the present invention in an open position.
Figure 4:
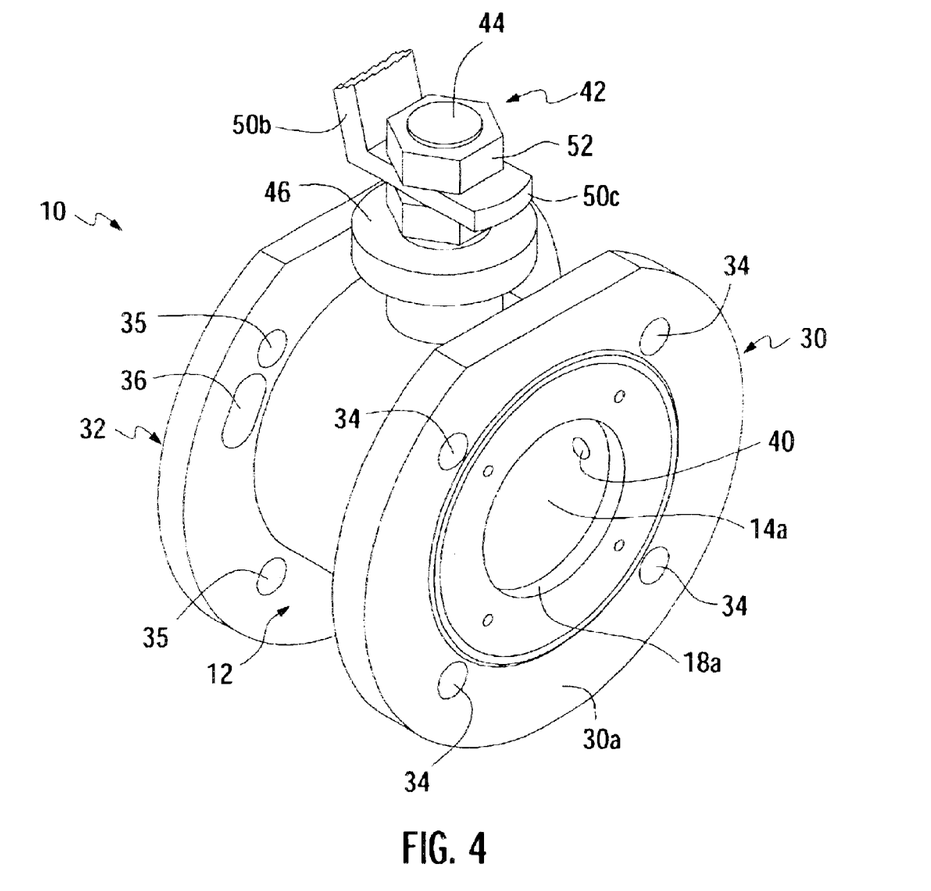
FIG. 4 is a perspective view of the preferred embodiment of a ball valve assembly of the present invention.

The ball valve assembly comprises an inlet or tank-side port 16 and an outlet or transmitter-side port 18 that are located concentrically about a longitudinal valve body axis, as shown by the letter A in FIGS. 1–3. As shown in the top sectional views of the preferred embodiment of the present invention in FIGS. 1 and 2, the valve body axis A indicates the vertical centerline of the valve body 12. In FIG. 3, which provides a front sectional view of the preferred embodiment of the present invention, the valve body axis A indicates the horizontal centerline of the valve body 12. The ball valve member 14 of the present invention has an inner surface 14a forming a through passage 20. With reference to FIG. 1, when the ball valve member 14 is in an open position, the inlet port 16, outlet port 18, and through passage 20 are in axial alignment along the valve body axis A to allow fluid flow therethrough. The inlet port 16 and outlet port 18 have inner surfaces, 16a and 18a respectively, as shown in FIG. 3, that together with the ball valve member inner surface 14a form a substantially cylindrical opening passing through the ball valve assembly 10 when the ball valve member 14 is in an open position.

In the preferred embodiment, the inner surfaces 14a, 16a, 18a of the ball valve member 14, inlet port 16, and outlet port 18 have the same diameter, and it may be appreciated that these components form a cylindrical opening through the ball valve assembly 10 having a uniform diameter. In this manner, the present invention provides a full port, that is, a cylindrical opening through the ball valve assembly having a uniform inner diameter substantially identical to the inner diameter of the piping connected thereto. A full port configuration minimizes interference on the operation of a level transmitter resulting from the transmitter isolation valve itself, allowing the level transmitter to operate more accurately and with less maintenance. In the preferred embodiment, the cylindrical opening has a uniform diameter, shown by the letter B in FIG. 3, of a minimum of about 76 millimeters. This allows use of the preferred embodiment of the present invention for nominal pipe sizes having inner diameters of at least 3 inches.

The ball valve member 14 also has an outer surface including a pair of opposing sealing faces having a radius of curvature, namely, a first sealing face 22 and a second sealing face 24 shown in FIGS. 1 and 2. Upon rotation of the ball valve member 14 from an open position shown in FIG. 1 to a closed position shown in FIG. 2, the first sealing face 22 is placed in sealing engagement with the inlet port 16 to prevent fluid flow therethrough and the second sealing face 24 is placed in sealing engagement with the outlet port 18. The first sealing face 22 slidingly engages the inlet port 16 along a seat portion 26 thereof as the ball valve member 14 is moved between an open and closed position. Similarly, the second sealing face 24 slidingly engages a seat portion 28 of the outlet port 18. The ball valve member 14 is thus rotatably mounted with the valve body 12 on the seat portions 26, 28 of the inlet and outlet ports 16, 18 of the valve body 12.

It can be appreciated with reference to FIG. 2 that with the ball valve member 14 placed in the closed position, the sealing engagement of the first sealing face 22 and the inlet port 16 prevents fluid flow therethrough. In the preferred embodiment, the ball valve body 12 and ball valve member 14, including the radius of curvature of the outside surface thereof, are sized to allow the ball valve body 12 to be short in length as measured along the valve body axis A. In the preferred embodiment, the length of the valve body 12, as shown by the letter C in FIG. 3, has a maximum length of about 118 millimeters measured along the valve body axis A. This allows use of the present invention with industrial tanks in cramped spaces. The reduced length configuration of the transmitter isolation valve assembly of the present invention places the level transmitter closer to its associated tank, which allows the level transmitter to operate more accurately and with less maintenance, and further minimizes the amount of dead space associated with the transmitter isolation valve to prevent buildup of pulp or other media therein.

Figure 5:
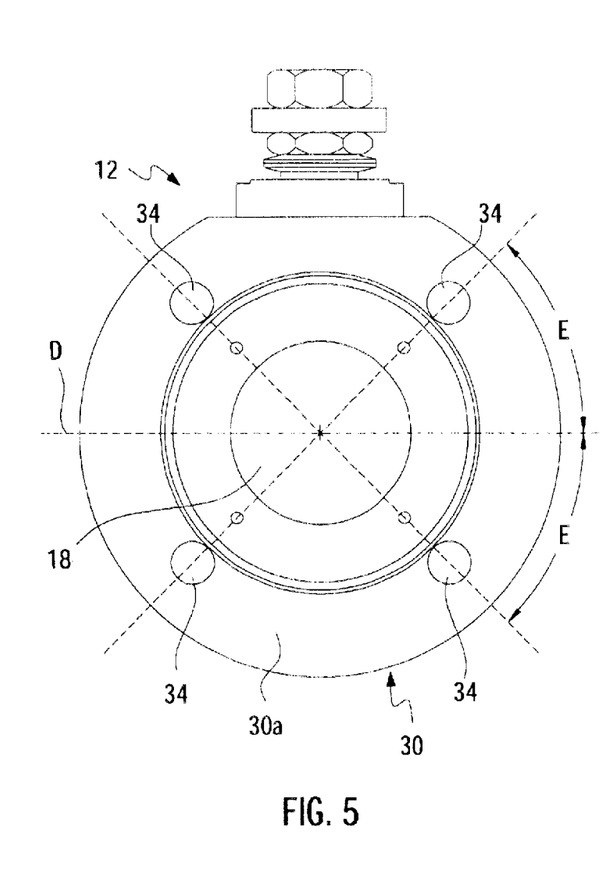
FIG. 5 is an outlet or transmitter side view of the preferred embodiment of a ball valve assembly of the present invention.
Figure 6:
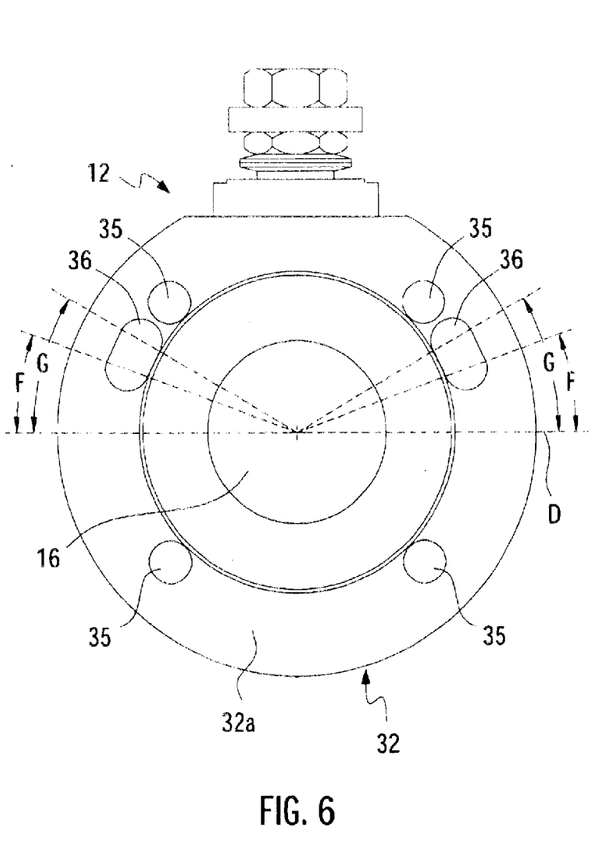
FIG. 6 is an inlet or tank side view of the preferred embodiment of a ball valve assembly of the present invention.

The preferred embodiment of the present invention has a valve body 12 that further comprises a transmitter side flange 30 having a front face 30a for mounting a level transmitter (not shown) thereto. A perspective view of the ball valve assembly 10 and the front face 30a of the transmitter side flange is provided in FIG. 4. Another view of the front face 30a of the transmitter side flange is provided in FIG. 5. With reference to FIG. 5, the transmitter side flange 30 of the preferred embodiment is provided with four bolt holes 34 positioned along the outer periphery of the flange in a standard ANSI 150 stud bolt orientation. To accommodate the mounting configuration of standard level transmitter flanges, the bolt holes 34 are positioned equidistant from one another along the outer periphery of the flange. Each bolt hole 34 is positioned at a forty-five degree angle, shown by the letter E in FIG. 5, either above or below the horizontal center line of the valve body shown by the letter D in FIG. 5, and has ⅝"-11 female thread A rear perspective view of the tank side flange 32 is provided in FIG. 4; and FIG. 6 provides a view of the front face 32a of the tank side flange. With reference to FIG. 6, it can be seen that the tank side flange 32 provides four bolt holes 35 positioned along the outer periphery of the tank side flange 32 in the same configuration as the bolt holes 34 provided in the transmitter side flange 30. Thus, similar to the transmitter side flange 30, the tank side flange 32 is configured to accommodate stud bolt orientations for standard ANSI 150 flanges. Additionally, the tank side flange 32 is provided with two bolt slots 36 located on a standard ANSI 150 bolt circle, but located from about twenty-five degrees F. to about twenty-seven degrees G above the horizontal centerline D, as shown in FIG. 6. The unthreaded bolt slots 36 allow the tank side flange 32 to accommodate nonstandard pipe flanges, namely, pipe flanges configured to mount a knife gate valve. This allows the present invention to replace a transmitter isolation valve of the knife gate type without having to replace or retrofit the pipe flange used in mounting the knife gate valve.

The present invention further comprises means for flushing a diaphragm face of a level transmitter connected to the outlet port 18 with a purge media, the means for flushing comprising a purge port 38 positioned on the valve body 12 and a cylindrical purge passage 40 formed in the ball valve member 14. The purge media may be water or steam injected into the valve body 12 via the purge port 38 to flush material collected in the valve body 12 back into the tank vessel operatively connected thereto. The purge media may also be any other material that can safely dissolve or remove any buildup that can occur in the valve body 12 or on the diaphragm face of a level transmitter. The purge passage 40 has a first end 40a formed in the inner surface 14a of the ball valve member and a second end 40b formed in the second sealing face 24 of the ball valve member. As shown in FIG. 2, the purge port 38 is positioned on the valve body 12 to allow fluid communication between the purge port 38, the ball valve member through passage 20, the purge passage 40, and the outlet port 18 when the ball valve member 14 is in a closed position. When the ball valve member 14 is in an open position as shown in FIG. 1, the purge port 38 is in fluid communication with the purge passage 40, the through passage 20, and the outlet port 18; and additionally with the inlet port 16.

In the preferred embodiment of the present invention, the purge passage 40 is located concentrically about a purge passage axis shown by the letter H in FIG. 1. When the ball valve member 14 is in the open position, the purge passage axis H passes through the outlet port 18. In this manner a purge fluid introduced into the valve body 12 through the purge port 38 is directed generally through the outlet port 18 toward the diaphragm face of a level transmitter located adjacent thereto. Thus, the preferred embodiment of the present invention uses a singe port for flushing the diaphragm face of the level transmitter and generally backflushing the inner chamber of the valve body 12 through the inlet port 16 and back into a storage tank communicating with the inlet port 16. In the preferred embodiment, the purge port 38 is located concentrically about a purge port axis, shown by the letter J in FIG. 1, which is in alignment with the second end 40b of the purge passage when the valve member 14 is in an open position. As shown in FIG. 1, when the valve member 14 is in an open position, the purge passage axis J passes through the second end 40b of the purge passage.

With reference to FIG. 2, which shows the ball valve assembly 10 with the ball valve member 14 in a closed position, the purge port 38 and purge passage 40 also provide means for depressuring the inner chamber 13 after the ball valve member 14 has been moved to the closed position. This enhances the safety associated with level transmitter maintenance, by relieving excess pressure buildup between the sealed inlet port 16 and the level transmitter prior to removing the level transmitter from the outlet port 18. Depressuring the inner chamber of the ball valve body 12 with the ball valve member 14 in a closed position also confirms that the inlet port 16 is properly sealed prior to removing the level transmitter. With the ball valve member 14 in the closed position, the purge port 38 may also be utilized to calibrate the level transmitter. It can be appreciated that the single purge port 38 and the purge passage 40 of the present invention may be utilized not only to flush the diaphragm face of the level transmitter and backflush the ball valve assembly with the valve in an open position, but also to depressurize the ball valve assembly and calibrate the level transmitter with the valve in a closed position. In the preferred embodiment, the purge port 38 is provided with an internal threaded cylindrical opening of a one quarter inch female national pipe tapered (FNPT) type. This NPT port may be used for connection to a source of purge media or to a transmitter calibration device. The preferred embodiment of the present invention further comprises a threaded NPT male plug (not shown) that may be threadably mounted in the purge port 38 when it is not in use for backflushing the valve body 12, bleeding pressure from the valve body 12, or otherwise calibrating a level transmitter.

The present invention further comprises means for selectively rotating the ball valve member 14 between an open position wherein the inlet port 16, the outlet port 18, and the through passage 20 are in fluid alignment, and a closed position wherein the first sealing face 22 is in sealing engagement with the inlet port 16 to prevent fluid flow therethrough and the second sealing face 24 is in sealing engagement with the outlet port 18. As shown in FIG. 3, means for selectively rotating comprises a control lever assembly 42 having a ball valve stem 44 rotatably mounted in a vertical valve stem hub 46 formed in the valve body 12. The control lever assembly 42 further comprises means for concentrically mounting the ball valve member 14 to a lower end of the ball valve stem 44. In the present invention the lower end of the ball valve stem 44 is rectangular, and is operatively mounted in a rectangular slot 48 formed in the ball valve member 14. The flow control quarter-turn ball valve member 14 of the present invention is rotatably mounted on a rotational axis perpendicular to the valve body axis A.

The control lever assembly 42 includes a handle 50 operatively mounted at its proximal end to an upper end of the ball valve stem 44. The handle 50 has an upper flat portion 50a integrally connected to an inclined portion 50b that is integral with an inner flat portion 50c. As shown in FIG. 1, the inner flat portion 50c and inclined portion 50b has a horizontal axis aligned with the valve body axis shown by the letter A in FIG. 1, thereby providing visual confirmation of the ball/port position. The upper flat portion 50a of the handle 50 is aligned along a horizontal axis, shown by the letter K in FIG. 1, that is offset from the horizontal axis of the inner flat portion 50c and the inclined portion 50b. In the preferred embodiment, this offset angle, shown by the letter L in FIG. 1, is about forty-five degrees. Thus, the handle 50 has a distal end having a longitudinal axis that is offset from the valve body axis A of the valve body 12 about forty-five degrees when the ball valve member 14 is in an open position. This allows the ball valve assembly 10 of the present invention to be utilized in a cavity formed in tank wall insulation where the ball valve assembly 10 is installed in a recessed area within the tank wall installation. With the handle configuration of the present invention, it can be appreciated that the distal end of the handle 50 will clear insulation as it is moved between an open and a closed position, thereby minimizing the size of the cavity necessary to operate the ball valve assembly 10.

The inner flat portion 50c of the handle 50 is provided with a handle opening for seating it around the threaded upper end of the ball valve stem 44 inserted therethrough. Nuts 52 are provided on the threaded upper end of the ball valve stem 44 for releasably retaining the inner flat portion 50c of the handle 50 in place. The control valve lever assembly 42 further comprises a lip 54 downwardly extending from the handle 50, which engages a pair of conventional integral stop protrusions (not shown) on the side of the ball valve stem hub 46. One of the pair of stop protrusions engages one side of the lip 54 of the control lever assembly when the ball valve member 14 is in an open position and an opposite side of the lip 54 engages the second stop protrusion when the ball valve member 14 is in a closed position. The lip 54 restricts the concomitant rotational movement of the handle 50 and ball valye member 14 to a ninety degree arc necessary to move the ball valve member, 14 from an open to a closed position. The present invention may also comprise a means for locking (not shown) the control valve lever assembly in its open or closed position.

It is to be understood that the form of the invention shown is a preferred embodiment thereof and that various changes and modifications may be made therein without departing from the spirit of the invention or scope as defined in the following claims.

What is claimed is:

1. A ball valve assembly comprising,
   a ball valve body having an inner chamber, an inlet port, an outlet port in communication with said chamber for fluid flow therethrough, and a transmitter side flange and a tank side flange for mounting said ball valve assembly, each said flange having a horizontal centerline and at least two upper bolt holes located about forty-five degrees above said centerline and at least two lower bolt holes located about forty-five degrees below said centerline,
   a ball valve member mounted in said chamber, said ball valve member having an inner surface forming a through passage, an outer surface including a first sealing face and a second sealing face, and a purge passage having a first end formed in said inner surface and a second end formed in said second sealing face, and,
   means for selectively rotating said ball valve member between an open position wherein said inlet port, said outlet port, and said through passage are in fluid alignment, and a closed position wherein said first sealing face is in sealing engagement with said inlet port to prevent fluid flow therethrough and said second sealing face is in sealing engagement with said outlet port.

2. A ball valve assembly as described in claim 1 wherein said ball valve body further comprises a purge port positioned on said valve body to allow fluid communication between said purge port, said purge passage, said through passage, and said outlet port when said ball valve member is in said closed position; and to allow fluid communication between said purge port, said purge passage, said outlet port, and said inlet port when said ball valve member is in said open position.

3. A ball valve assembly as described in claim 2 wherein said purge passage is located concentrically about a purge passage axis passing through said outlet port when said ball valve member is in an open position.

4. A ball valve assembly as described in claim 3 wherein said purge port is located concentrically about a purge port axis passing through said second end of said purge passage when said valve member is in an open position.

5. A ball valve assembly as described in claim 2 wherein said purge port is a threaded female national pipe tapered (FNPT) port.

6. A ball valve assembly as described in claim 2 wherein said inlet port, said outlet port, and said through passage are located concentrically about a valve body axis when said valve member is in an open position.

7. A ball valve assembly as described in claim 6 wherein said inlet port, said outlet port, and said ball valve member have substantially cylindrical inner surfaces.

8. A ball valve assembly as described in claim 7 wherein said cylindrical inner surfaces of said inlet port, said outlet port, and said ball valve member have a uniform diameter of not less than about 76 millimeters.

9. A ball valve assembly as described in claim 6 wherein said ball valve body has a maximum length of about 118 millimeters measured along said valve body axis.

10. A ball valve assembly as described in claim 6 wherein said means for selectively rotating comprises a control lever assembly having a ball valve stem rotatably mounted in a vertical valve stem hub formed in said valve body, means for mounting said ball valve member to a lower end of said ball valve stem, and a handle operatively mounted at its proximal end to an upper end of said ball valve stem.

11. A ball valve assembly as described in claim 10 wherein said handle has a distal end having a longitudinal axis that is offset from said valve body axis about forty five degrees when said ball valve member is in an open position and a closed position.

12. A ball valve assembly as described in claim 1 wherein said tank side flange further comprises two bolt slots located from about twenty-five degrees to about twenty-seven degrees above said centerline.

13. A ball valve assembly for isolating a level transmitter, said assembly comprising a ball valve body having an inner chamber and a longitudinal valve body axis defined by an inlet port and an outlet port, a substantially spherical ball valve member rotatably disposed in said chamber, said ball valve member being moveable between a closed position where a portion of said ball valve member is in sealing engagement with said inlet port to prevent fluid flow therethrough to an open position where said inlet port, said outlet port, and said ball valve member define a cylindrical opening through said ball valve assembly, wherein said cylindrical opening has a uniform minimum diameter of about 76 millimeters and said valve body has a maximum length of about 118 millimeters measured along said body axis; said ball valve assembly further comprising means for flushing a diaphragm face of a level transmitter connected to said outlet port, wherein said means for flushing comprises a purge port positioned on said valve body and a cylindrical purge passage formed in said ball valve member, said purge passage communicating with said purge port and said opening when said ball valve member is in an open position.

14. A ball valve assembly-as described in claim 13 wherein said purge passage has a longitudinal purge passage axis passing through said outlet port when said ball valve member is in an open position.

15. A ball valve assembly as described in claim 13 wherein said purge passage is positioned so that a purge media passing through said purge passage is directed toward said outlet port upon exiting said purge passage.

16. A ball valve assembly as described in claim 13 wherein said ball valve member has an outer surface, said purge passage has an end formed in said outer surface, and said purge port is located concentrically about a purge port axis aligned with said end when said ball valve member is in an open position.

17. A ball valve assembly as described in claim 13 wherein said purge port is a threaded female national pipe tapered (FNPT) port.

18. A ball valve assembly for isolating a level transmitter, said assembly comprising:
- a ball valve having an inner chamber, a longitudinal valve body axis defined by an inlet port and an outlet port, a ball valve member rotatably disposed within said chamber, and means for selectively rotating said ball valve member between an open position and a closed position;
- wherein said means for rotating comprises a handle having a proximal end operatively connected to said ball valve member, and a distal end having a longitudinal axis that is positioned offset from said valve body axis at an angle of about forty five degrees when said ball valve member is in an open position;
- wherein said ball valve member has an inner surface forming a through passage, an outer surface including a first sealing face and a second sealing face, and a purge passage having a first end formed in said inner surface and a second end formed in said second sealing face;
- wherein said ball valve body further comprises a purge port positioned on said valve body to allow fluid communication between said purge port said through passage, said purge passage, and said outlet port when said ball valve member is in said closed position, and to allow fluid communication between said purge port, said purge passage, said outlet port, said through passage, and said inlet port when said ball valve member is in said open position;
- wherein said purge port is located concentrically about a purge port axis passing through said second end of said purge passage when said valve member is in an open position.

19. A ball valve assembly as described in claim 18 wherein said longitudinal axis of said distal end of said handle is positioned offset from said valve body axis at an angle of about forty five degrees when said ball valve member is in a closed position.

20. A ball valve assembly as described in claim 18 wherein said purge passage is located concentrically about a purge passage axis passing through said outlet port when said ball valve member is in an open position.

21. A ball valve assembly as described in claim 18, wherein said inlet port, said outlet port, and said through passage are located concentrically about a valve body axis when said valve member is in an open position.

22. A ball assembly as described in claim 21 wherein said inlet port, said outlet port, and said ball valve member have substantially cylindrical inner surfaces of not less than about 76 millimeters.

23. A ball assembly as described in claim 22 wherein said ball valve body has a maximum length of about 118 millimeters measured along said valve body axis.

24. A ball valve assembly for isolating a level transmitter, said assembly comprising a ball valve body having an inner chamber, a longitudinal valve body axis defined by an inlet port and an outlet port, a ball valve member rotatably disposed within said chamber, and means for selectively rotating said ball valve member between an open position and a closed position wherein said means for rotating comprises a handle having a proximal end operatively connected to said ball valve member, and a distal end having a longitudinal axis that is positioned offset from said valve body axis at an angle of about forty five degrees when said ball valve member is in an open position, wherein said ball valve body further comprises a purge port positioned on said valve body to allow fluid communication between said purge port, said through passage, said purge passage, and said outlet port when said ball valve member is in said closed position; and to allow fluid communication between said purge port, said purge passage, said outlet port, said through passage, and said inlet port when said ball valve member is in said open position.

* * * * *